(12) United States Patent
Lin et al.

(10) Patent No.: US 8,144,638 B2
(45) Date of Patent: Mar. 27, 2012

(54) SYSTEM AND METHOD THEREOF FOR DYNAMICALLY ADJUSTING SLEEP/AWAKE INTERVALS OF WIRELESS NETWORK DEVICE

(75) Inventors: Chia-Yen Lin, Taipei (TW); Hsi-Lu Chao, Taipei (TW); Tzu-Jane Tsai, Hsinchu County (TW)

(73) Assignees: Industrial Technology Research Institute, Hsinchu (TW); National Chiao Tung University, Hsinchu (TW)

( * ) Notice: Subject to any disclaimer, the term of this patent is extended or adjusted under 35 U.S.C. 154(b) by 904 days.

(21) Appl. No.: 12/185,824

(22) Filed: Aug. 5, 2008

(65) Prior Publication Data
US 2009/0296617 A1 Dec. 3, 2009

(30) Foreign Application Priority Data
May 29, 2008 (TW) ................. 97119934 A

(51) Int. Cl.
*H04B 1/00* (2006.01)
(52) U.S. Cl. ............... 370/311; 455/127.5; 455/574
(58) Field of Classification Search ................. None
See application file for complete search history.

(56) References Cited

U.S. PATENT DOCUMENTS

| 2007/0202835 A1 | 8/2007 | Son et al. | |
|---|---|---|---|
| 2008/0175147 A1* | 7/2008 | Lakkakorpi | 370/230 |
| 2008/0182567 A1* | 7/2008 | Zhu et al. | 455/418 |
| 2009/0073907 A1* | 3/2009 | Cai | 370/311 |
| 2009/0197528 A1* | 8/2009 | Chin et al. | 455/39 |
| 2010/0208636 A1* | 8/2010 | Kim et al. | 370/311 |

FOREIGN PATENT DOCUMENTS

| TW | I246864 | 1/2006 |
|---|---|---|
| TW | I279721 | 4/2007 |
| TW | 200746675 | 12/2007 |
| TW | 200806062 | 1/2008 |
| TW | 200810571 | 2/2008 |
| WO | 2006/040769 | 4/2006 |
| WO | 2006/095322 | 9/2006 |
| WO | 2006/135157 | 12/2006 |

OTHER PUBLICATIONS

Article titled "Energy Saving Mechanism in the IEEE 802.16e Wireless MAN" authored by Yang Xiao, IEEE Communications Letters, pp. 595-597, 2005.

(Continued)

*Primary Examiner* — Robert Scheibel
(74) *Attorney, Agent, or Firm* — Jianq Chyun IP Office

(57) ABSTRACT

A system and a method thereof for dynamically adjusting sleep/awake intervals of a wireless network device are provided. The system has at least one base station (BS) and at least one wireless network device. The system performs the method to dynamically adjust the sleep/awake intervals by properly delaying and combining delivery of data such that the wireless network device is turned into a sleep mode after finishing data delivery within an adjusted period. Thereby, the number of awake frames of a mobile subscriber station (MSS) can be reduced without sacrificing the quality of service (QoS).

23 Claims, 9 Drawing Sheets

OTHER PUBLICATIONS

Article titled "Performance Analysis of Sleep Mode Operation in IEEE802.16e" authored by Seo, et al., in Proceedings of the IEEE VTC, pp. 1169-1173, 2004.

Article titled "Performance Analysis of an Energy Saving Mechanism in the IEEE 802.16e Wireless MAN" in Proceedings of the IEEE CCNC, pp. 406-410, 2006.

Article titled "Energy Management in the IEEE 802.16e MAC" authored by Zhang, et al., IEEE Communication Letters, pp. 311-313, 2006.

Article titled "Performance Study of Power Saving Classes of Type I and II in IEEE 802.16e" authored by Kong, et al., in Proceedings of the IEEE LCN, pp. 20-27, 2006.

Article titled "Energy-efficient Sleep-mode Operations for Broadband Wireless Access Systems" authored by Chen, et al., in Proceedings of the IEEE VTC, pp. 1-5 2006.

"Office Action of Taiwan Counterpart Application", issued on Oct. 24, 2011, p. 1-p. 4.

* cited by examiner

SYSTEM AND METHOD THEREOF FOR DYNAMICALLY ADJUSTING SLEEP/AWAKE INTERVALS OF WIRELESS NETWORK DEVICE

CROSS-REFERENCE TO RELATED APPLICATION

This application claims the priority benefit of Taiwan application serial no. 97119934, filed on May 29, 2008. The entirety of the above-mentioned patent application is hereby incorporated by reference herein and made a part of this specification.

BACKGROUND OF THE INVENTION

1. Field of the Invention

The present invention generally relates to a system and a method thereof for a wireless communication device, and more particularly, to a system and a method thereof for dynamically adjusting the sleep/awake intervals of a wireless network device to reduce the power consumption.

2. Description of Related Art

The Worldwide Interoperability for Microwave Access (WiMAX) is a new wireless broadband network system, and the system adopts the 802.16 standard established by the Institute of Electrical and Electronics Engineers, Inc. (IEEE) as its operation standard. The IEEE 802.16e standard was further established in 2005 to meet the requirements of mobile wireless communications. The IEEE 802.16e standard is well focused in broadband wireless access (BWA) techniques due to its characteristics such as broad bandwidth, high portability, great coverage, and good connection quality, etc.

In the IEEE 802.16e standard, the connection between a base station (BS) and a mobile subscriber station (MSS) is accomplished through the transmission/reception of a series of frames. To achieve higher efficiency in wireless communication applications, different quality of service (QoS) types are defined in the IEEE 802.16e standard regarding different network environments, such as Unsolicited Grant Service (UGS), real-time Polling Service (rtPS), Extended rtPS (ErtPS), non-real-time Polling Service (nrtPS), and Best Effort (BE) service.

How to prolong the operation time of an IEEE 802.16e MSS by reducing the power consumption thereof is a very important subject. Three power-saving modes are defined in the IEEE 802.16e standard in order to reduce the power consumption. FIG. 1 is a timing diagram of the IEEE 802.16e standard in the three power-saving modes. Referring to FIG. 1, the sleep time 20 and listen time 22 of a MSS in three different power-saving modes 14, 16, and 18 when the MSS is within a sleep state period 12 are illustrated., wherein the sleep state period 12 is between two normal operation periods 10. The MSS is in a normal operation mode during the normal operation periods 10, while the MSS is in a sleep mode during the sleep state period 12. Foregoing three power-saving modes 14, 16, and 18 are started when the MSS is in the sleep mode.

In the first power-saving mode 14, the MSS wakes up in the listen time 22 after sleeping for some time to listen whether there is any packet to be received. If there is no packet to be received, the next sleep time 20 of the MSS is extended exponentially. This power-saving mode is suitable for the data transmission of BE and nrtPS.

In the second power-saving mode 16, the MSS also wakes up after sleeping for some time to listen whether there is any packet to be received. If there is no packet to be received, the MSS enters the sleep mode again. The difference of this power-saving mode from the first power-saving mode is that the sleep time 20 in the second power-saving mode has a fixed length. Accordingly, the second power-saving mode is suitable for transmitting real-time data, such as the data transmission of UGS and rtPS.

In the third power-saving mode 18, the BS specifies the sleep time 20, and the MSS returns to the normal operation mode after a sleep time 20.

In the 802.16e standard, a MSS can establish multiple connections at the same time, and each of the connections has its own sleep time and listen time. The time a MSS can actually sleep and listen has to be calculated if the MSS has multiple connections. As shown in FIG. 2, the MSS A has three connections and each of the connections has its own sleep time 24 and listen time 26. Thus, the MSS A can only enter the sleep mode when all the three connections thereof are in sleep state (i.e., the period 28 in FIG. 2), and this is very inefficient in terms of the power consumption of the MSS.

Regarding the power-saving mechanism of the IEEE 802.16e standard, most existing patents are focused on sensor networks and wireless local area networks (WLAN). As to the academic field, even though the power-saving mechanism specified by the IEEE 802.16e standard has been studied, the academic documents are mostly focused on performance analysis with mathematical models, and wherein only real-time data types, but not those non-real-time data types which are mostly transmitted over the networks, are considered.

SUMMARY OF THE INVENTION

Accordingly, the present invention is directed to a method for dynamically adjusting the sleep/awake intervals of a wireless network device, wherein the performance of the power-saving mechanism specified in the IEEE 802.16e standard is improved and accordingly the power consumption is reduced.

The present invention provides a method for dynamically adjusting the sleep/awake intervals of a wireless network device. An exemplary example of the method includes: determining at least one awake frame candidate set of the wireless network device according to the transmission cycle and the maximum grant delay of at least one periodic connection of the wireless network device; determining at least one sleep interval and at least one awake interval of the wireless network device according to the data generation rate and the maximum grant delay of at least one non-periodic connection of the wireless network device; and determining an actual sleep interval and an actual awake interval of the wireless network device according to the awake frame candidate set, the sleep interval, and the awake interval.

The present invention provides a system for dynamically adjusting the sleep/awake intervals of a wireless network device. An exemplary example of the system includes at least one wireless network device and at least one base station (BS). A plurality of connections are established between the BS and the wireless network device, and the BS determines at least one awake frame candidate set of the wireless network device according to the transmission cycle and the maximum grant delay of at least one periodic connection among these connections. The BS determines at least one sleep interval and at least one awake interval of the wireless network device according to the data generation rate and the maximum grant delay of at least one non-periodic connection among these connections. After that, the BS determines an actual sleep interval and an actual awake interval of the wireless network device according to the awake frame candidate set, the sleep interval, and the awake interval.

The present invention provides a method for dynamically adjusting the sleep/awake intervals of a wireless network device. An exemplary example of the method includes: determining a grant delay range of each relaying frame of a plurality of periodic connections of the wireless network device according to the transmission cycles and the maximum grant delays of the periodic connections; and then determining an awake frame candidate set of the wireless network device according to the overlapping of the grant delay range of each relaying frame, and allowing the wireless network device to transmit data within the relaying frames in the awake frame candidate set.

The present invention provides a method for dynamically adjusting the sleep/awake intervals of a wireless network device. An exemplary example of the method, a minimum value of the maximum grant delays of a plurality of non-periodic connections of the wireless network device is obtained according to the information of the maximum grant delays of the non-periodic connections. Besides, in the method, a queue size is obtained according to the length of the $i^{th}$ sleep interval, the length of the $i^{th}$ awake interval, and the data generation rates of the non-periodic connections of the wireless network device, wherein i is a positive integer. After that, the length of the $(i+1)^{th}$ awake interval of the wireless network device is obtained according to the queue size and a link capacity of the wireless network device. Moreover, the length of the $(i+1)^{th}$ sleep interval of the wireless network device is obtained according to the minimum value, the length of the $i^{th}$ sleep interval, the length of the $i^{th}$ awake interval, and the length of the $(i+1)^{th}$ awake interval, and the total length of the $i^{th}$ sleep interval, the $i^{th}$ awake interval, the $(i+1)^{th}$ sleep interval, and the $(i+1)^{th}$ awake interval is restricted to be less than or equal to the minimum value. The wireless network device is controlled to be in the sleep mode during the $i^{th}$ sleep interval and the $(i+1)^{th}$ sleep interval and transmit data during the $i^{th}$ awake interval and the $(i+1)^{th}$ awake interval.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
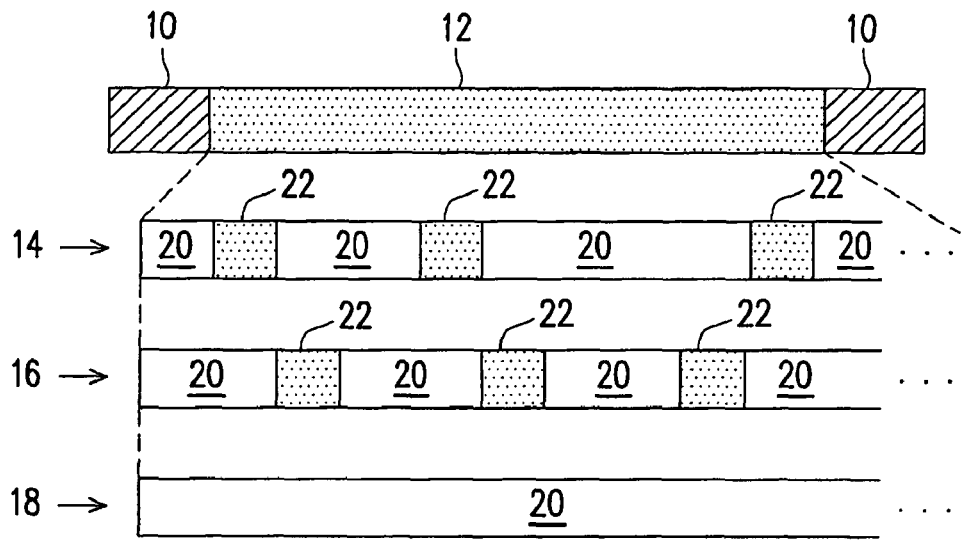
FIG. 1 is a timing diagram of the IEEE 802.16e standard in three power-saving modes.
Figure 2:
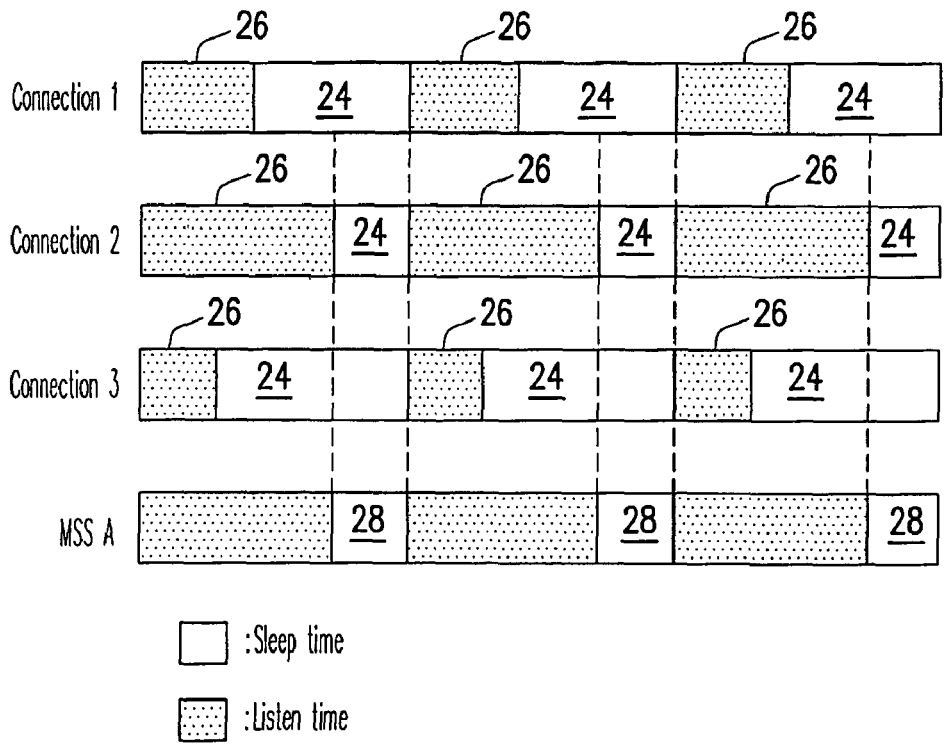
FIG. 2 is a timing diagram of three connections of a mobile subscriber station (MSS) A.

Reference will now be made in detail to the present preferred embodiments of the invention, examples of which are illustrated in the accompanying drawings. Wherever possible, the same reference numbers are used in the drawings and the description to refer to the same or like parts.

The present invention provides a mechanism for extending the sleep time of a mobile subscriber station (MSS), and accordingly reducing the power consumption thereof, without losing the quality of service (QoS) in regard to both real-time and non-real-time data types. Exemplary embodiments consistent of the present invention, a power-saving mechanism for dynamically adjusting the sleep time of a MSS is provided based on the operation concept that the lengths of the sleep/awake intervals are non-periodic and whether the MSS is in the sleep state or the listen state is determined by the traffic load and the QoS requirement of the third power-saving mode in the IEEE 802.16e standard.

Figure 3:
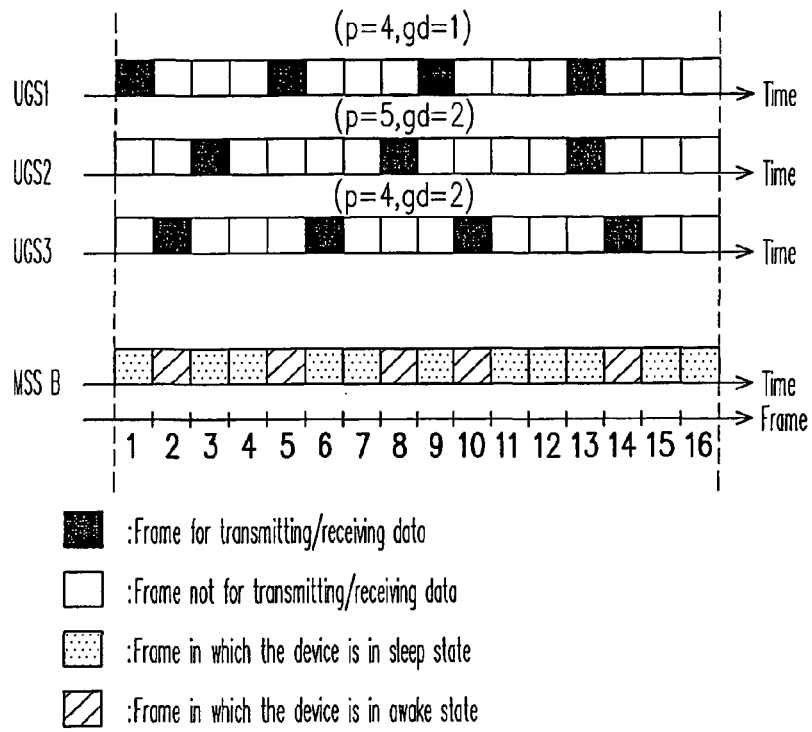
FIG. 3 is a timing diagram of three Unsolicited Grant Service (UGS) connections of a MSS B.

FIG. 3 illustrates a method for dynamically adjusting the sleep/awake intervals of a periodic connection of a wireless network device. Referring to FIG. 3, the MSS B has three Unsolicited Grant Service (UGS) connections UGS1, UGS2, and UGS3, the data characteristics of each UGS connection are indicated by a transmission cycle (p) and a maximum. grant delay (gd), and an awake frame candidate set of the MSS B is obtained. In the present example, the transmission cycle p of the first connection UGS1 is 4, and the maximum grant delay gd thereof is 1; the transmission cycle p of the second connection UGS2 is 5, and the maximum grant delay gd thereof is 2; and the transmission cycle p of the third connection UGS3 is 4, and the maximum grant delay gd thereof is 2. During a frame 1, the first connection UGS1 has a packet to transmit; however, because the maximum grant delay gd thereof is 1, the MSS B looks into the next frame 2. Then, since the third connection UGS3 also has a packet to transmit during the frame 2, the MSS B delays the packet of the first connection UGS1 for a frame and wakes up during the frame 2 to transmit the packets of both the first connection UGS1 and the third connection UGS3. Similarly, during the frame 3, the second connection UGS2 has a packet to transmit, and since the maximum grant delay gd thereof is 2, the MSS B looks into the next frame. Then since the first connection UGS1 also has a packet to transmit during the frame 5, the MSS B stays in the sleep state until the frame 5 and then wakes up to transmit the packets of both the first connection UGS1 and the second connection UGS2. Through the method described above, non-periodic sleep/awake intervals can be calculated, and the sleep time of the MSS can be prolonged without sacrificing the QoS. Other than the real-time UGS data type, in the present invention, the sleep/awake intervals when the MSS transmits non-real-time data types, such as non-real-time Polling Service (nrtPS) and Best Effort (BE), may also be calculated without sacrificing the QoS. As described above, because both real-time and non-real-time data transmissions in the IEEE 802.16e standard are considered in the dynamic power-saving mechanism of a MSS provided by the present invention, the requirements of different channel settings can be met.

The exemplary embodiment consistent of the present invention provides a method for dynamically adjusting the sleep/awake intervals regarding a mobile WiMAX (i.e. IEEE 802.16e) network so as to reduce the power consumption. The major difference of the present invention from the conventional techniques is that the method provided by the present invention supports the definition in the WiMAX standard. Since real-time Polling Service (rtPS) and Extended rtPS (ErtPS) have the same traffic parameters, the rtPS will be described below as an example. Additionally, in order to achieve the best power-saving effect, BE data is transmitted together in the awake intervals. In order to achieve foregoing purpose, the power-saving method in the present invention has three procedures, and these procedures will be respectively described below.

First Procedure: Determining an Awake Frame Candidate Set of a Periodic Connection A periodic UGS connection is taken as an example in this procedure. In order to transmit the packets of each UGS connection within the same frame, the UGS data frames distributed at different time points have to be combined together according to the transmission cycle, the data quantity, and the maximum grant delay of the UGS connections, and in which frame these data frames are combined has to be determined.

More than one possible awake frame intervals are obtained by executing the first procedure, and an awake frame interval may include a plurality of continuous frames or only one frame. Even though only a possible awake frame interval is obtained, during the actual operation, one of the frames is simply selected from the possible awake frame interval for transmitting data. This is because when a plurality of MSSs switch between the sleep and awake modes, a MSS in the awake mode will use the bandwidth originally assigned to a MSS in the sleep mode; similarly, when the MSS enters the sleep mode, the resources in the sleep interval thereof can be released and used by a MSS which switches from the sleep mode to the awake mode. In an embodiment of the present invention, the awake frame candidate set is calculated through matrix algebra, wherein the number of awake frames is determined according to the actually accumulated data quantity. In addition, since the execution result of the first procedure is at least one "possible" awake frame interval, the at least one "possible" awake frame interval can be referred as an "awake frame candidate set".

Figure 4:
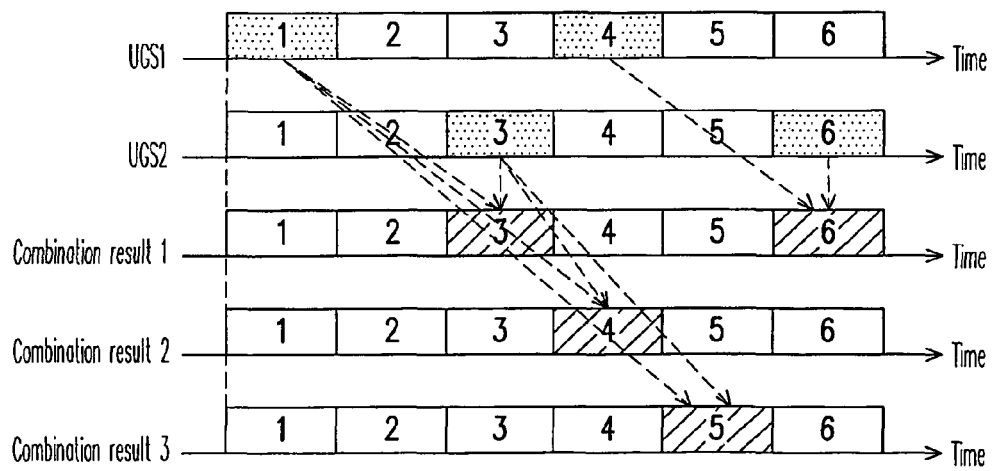
FIG. 4 illustrates several possibilities of combining the awake frames of two UGS connections according to the exemplary embodiment consistent of the present invention.

FIG. 4 illustrates the design concept of the first procedure. The first frame of the first connection UGS1 and the $3^{rd}$ frame of the second connection UGS2 may also be combined into the $4^{th}$ frame or the $5^{th}$ frame besides being combined into the $3^{rd}$ frame provided that the delayed time of each delayed frame does lot exceed the maximum grant delay of the corresponding UGS connection.

Figure 5:
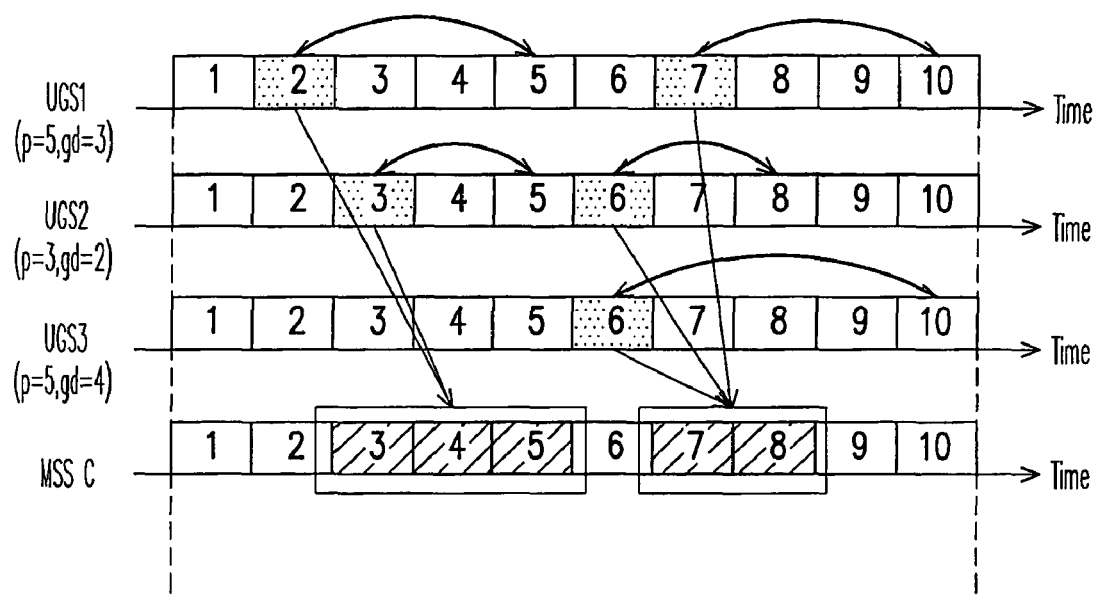
FIG. 5 illustrates a method for combining the awake frames of three UGS connections according to the exemplary embodiment consistent of the present invention.

To be more specific, in the first procedure, the next frame in which the MSS is to be waken up for transmitting data is first located regarding each UGS connection before the data is combined, the nearest frame is then located according to the maximum grant delay of the UGS connection, and besides, which frames can be combined with this frame is further determined. As shown in FIG. 5, the MSS has three UGS connections UGS1, UGS2, and UGS3. Taking the connection UGS1 as an example, the transmission cycle p thereof is 5 (i.e., the connection UGS1 transmits data during the $2^{nd}$, the $7^{th}$, the $12^{th}$ . . . frame), and the maximum grant delay gd thereof is 3 (i.e., the data to be transmitted in the $2^{nd}$ frame can be delayed at most to the $5^{th}$ frame). The first relaying frames of the three UGS connections are respectively the $2^{nd}$, the $3^{rd}$, and the $6^{th}$ frame. With the maximum grant delays of the three connections UGS1, UGS2, and UGS3 being respectively 3, 2, and 4, an grant delay range of each relaying frame can be determined. Namely, it can be determined that the connections UGS1, UGS2, and UGS3 can respectively transmit data within the frame periods [2, 3, 4, 5], [3, 4, 5], and [6, 7, 8, 9, 10]. Thus, the awake frame candidate set can be determined according to the overlapping of the grant delay range of each relaying frame. For example, the data of the connections UGS1 and UGS2 can be combined and transmitted during the frame period [3, 4, 5], and the second relaying frames of the connections UGS1 and UGS2 can be combined with the first relaying frame of the connection UGS3 into the frame period [7, 8]. Accordingly, the two awake frame candidate sets are respectively determined as the frame period [3, 4, 5] and the frame period [7, 8].

Foregoing algorithm can be expressed with following pseudo codes:

step 1: Let $[F_{i,j}, Y_{i,j}]$ be the next awake-frame candidate set of connection (i,j), where $F_{i,j}$ is the next transmission frame of connection (i, j), and $Y_{i,j}=F_{i,j}+d(i, j)$. We define $[F_{i,j}, Y_{i,j}]<[F_{i,k}, Y_{i,k}]$ if $F_{i,j}<F_{i,k,s}$ or $F_{i,j}=F_{i,k}$ and $Y_{i,j}<Y_{i,k}$, where j≠k. Let S be the union of the next awake-frame candidate sets of all UGS connections.

step 2: Choosing the smallest $[F_{i,s}, Y_{i,s}]$ in S. Let $F=F_{i,s}$, $Y=Y_{i,s}$. Update S by $S=S-[F_{i,s}, Y_{i,s}]$.

step 3: If S is empty, go to step 6. Else go to step 4.

step 4: Choosing the smallest $[F_{i,j}, Y_{i,j}]$ in S. If $F_{i,j} \leq Y$, go to step 5. Else go to step 6.

step 5: Let $F=\max[F_{i,j}, F]$, $Y=\min[Y_{i,j}, Y]$. Update S by $S=S-[F_{i,j}, Y_{i,j}]$. Go to step 3.

step 6: Get the next awake-frame candidate set [F, Y].

In foregoing pseudo codes, (i,j) represents the $j^{th}$ connection of the $i^{th}$ MSS, d(i, j) represents the maximum grant delay of the connection (i, j). $[F_{i,j}, Y_{i,j}]$ represents the next awake flame candidate set of the connection (i, j), $F_{i,j}$ represents a first frame in the awake frame candidate set $[F_{i,j}, Y_{i,j}]$ of the connection (i, j), $Y_{i,j}$ represents a last frame in the awake frame candidate set $[F_{i,j}, Y_{i,j}]$ of the connection (i, j), and S represents a union set of the next awake frame candidate sets of all the connections. In step 1 and step 2, the relative sizes of the awake frame candidate sets of all the UGS connections are determined, a smallest candidate set (i.e., the candidate set $[F_{i,s}, Y_{i,s}]$) is selected and assigned as the next awake-frame candidate set [F, Y], and the candidate set $[F_{i,s}, Y_{i,s}]$ is removed from the union set S. The relative sizes of the awake frame candidate sets are first determined according to the sequence of the first frames thereof on the time axis, and an awake frame candidate set having an earlier first frame is considered smaller than an awake frame candidate set having a later first frame. In short, if $F_{i,j}<F_{i,k}$, then $[F_{i,j}, Y_{i,j}]<[F_{i,k}, Y_{i,k}]$; however, if the first frames of two awake frame candidate sets are located at the same position on the time axis, the relative sizes of these two awake frame candidate sets are further determined according to their last frames. In short, if $F_{i,j}=F_{i,k}$ and $Y_{i,j}<Y_{i,k}$, then $[F_{i,j}, Y_{i,j}]<[F_{i,k}, Y_{i,k}]$. The reason for determining the awake-frame candidate set [F,Y] is that a connection having a smaller awake frame candidate set needs to wake up earlier for transmitting data therefore should have higher priority. Besides, because the smallest candidate set $[F_{i,s}, Y_{i,s}]$ or $[F_{i,j}, Y_{i,j}]$ has been deleted from the union set S in step 2 or step 5, the union set S in step 3 includes the awake frame candidate sets of other connections; however, if the union set S is empty, there is no more awake frame candidate set of any other connection in the union set S, and accordingly the awake-frame candidate set [F, Y] is the awake frame candidate set of the UGS connection of the MSS. In step 4, which awake frame candidate set can be combined with the current awake-frame candidate set [F, Y] is sequentially located in the union set S. If the sets can be combined, step 5 is executed to update the values of F and Y, and the updated value of F is the maximum value between the original value of F and the current value of $F_{i,j}$, and the updated value of Y is the minimum value between the original value of Y and the current value of $S_{i,j}$. Contrarily, if there is no more awake frame candidate set to be combined or there is no awake frame candidate set of any other connection in the union set S, the awake frame candidate set regarding each connection is updated in step 6. Referring to FIG. 5, in step 1, the first awake frame of the connection UGS1 is the frame 2 (i.e., $F_{i,j}=2$), and since the maximum grant delay thereof is 3, the last frame in the first awake frame candidate set thereof is 2+3=5, and accordingly [2, 3, 4, 5] is the first awake frame candidate set thereof. Since the connection UGS1 is a periodic connection, the subsequent awake frame candidate sets thereof can be sequentially obtained. Similarly, the first awake frame candidate sets of the connections UGS2 and UGS3 are respectively [3, 4, 5] and [6, 7, 8, 9, 10]. It can be understood by comparing the three awake frame candidate sets that [2, 3, 4, 5]>[3, 4, 5]>[6, 7, 8, 9, 10]. In step 2, the smallest awake frame candidate set is [2, 3, 4, 5], and accordingly F=2 and Y=5. In step 4, the current smallest awake frame candidate set is [3, 4, 5], and accordingly $F_{i,j}=3$ and $Y_{i,j}=5$. Since $(F_{i,j}=3) \leq (Y=5)$ the procedure proceeds to step 5. In step 5, F=max[3, 2]=3, )=min[5, 5]=5, and accordingly the first awake frame candidate set combined and transmitted by the connections UGS1 and UGS2 is [3, 4, 5]. In step 6, the second awake frame candidate set of the connection UGS2 is further combined. This is because the second awake frame candidate set of the connection UGS1 is [7, 8, 9, 10], the second awake frame candidate set of the connection UGS2 is [6, 7, 8], the first awake frame candidate set of the connection UGS3 is [6, 7, 8, 9, 10], and accordingly the smallest set among foregoing three sets is [6, 7, 8] based on foregoing definition.

In exemplary embodiments consistent of the present invention, an awake frame candidate set is determined according to the transmission cycles and the maximum grant delays of a plurality of periodic connections of a wireless network device. The step for determining the awake frame candidate set includes determining a grant delay range of each relaying frame according to the maximum grant delay of each connection and determining the awake frame candidate set according to the overlapping of the grant delay range of each relaying frame.

Second Procedure: Calculating an Awake Interval and a Sleep Interval of a Non-Periodic Connection (a rtPS, an ErtPS, or an nrtPS Connection)

Figure 6:
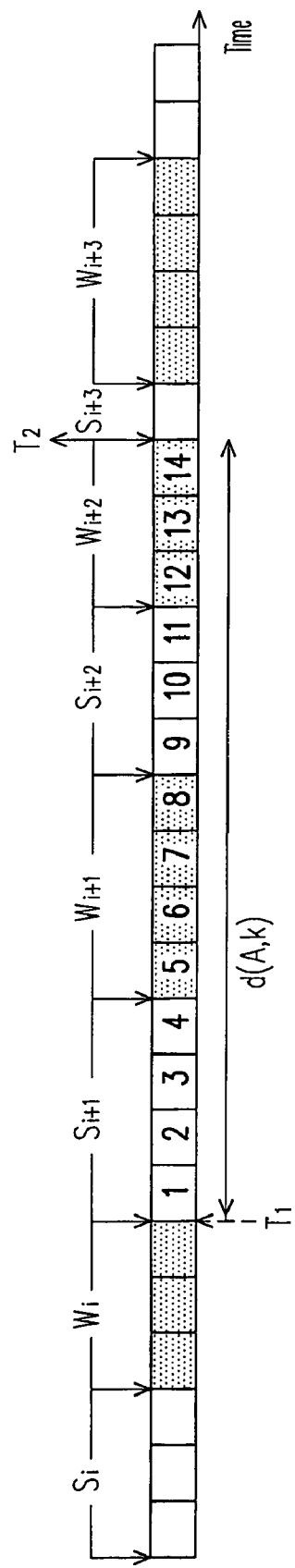
FIG. 6 is a timing diagram of an awake interval and a sleep interval of a real-time Polling Service (rtPS), an Extended rtPS (EitPS), or a non-real-time Polling Service (nrtPS) connection according to the exemplary embodiment consistent of the present invention.

The system accumulates the data for some time and then transmits the accumulated data together regarding a rtPS, an ErtPS, or a lrtPS non-periodic connection, wherein the frames for transmitting the data are referred as awake intervals, and those frames not for transmitting data are referred as sleep intervals. The data transmitted within each awake interval is the data accumulated in a previous awake interval and a previous sleep interval. Referring to FIG. 6, $S_i$ and $W_i$ respectively represent the $i^{th}$ sleep interval and the $i^{th}$ awake interval of a MSS A, and d(A,k) represents the maximum grant delay of a connection k of the MSS A. Before entering the sleep mode, the MSS A informs the BS about its queue size, and the BS assigns the bandwidth during the awake intervals of the MSS A to allow the MSS A to transmit data. Thus, the data to be transmitted during the $(i+1)^{th}$ awake interval (i.e., the awake interval $W_{i+1}$) of the MSS A is accumulated during the sleep interval $S_i$ and the awake interval $W_i$, and the data to be transmitted during the $(i+2)^{th}$ awake interval (i.e., the awake interval $W_{i+2}$) is accumulated during the sleep interval $S_{i+1}$ and the awake interval $W_{i+1}$.

The second procedure is to determine the number of frames in an awake interval and a sleep interval. As shown in FIG. 6, the MSS informs the BS about the data quantity generated during the frame period 1~8 before the $8^{th}$ frame is over and transmits the data during the frame period 12~14. In order to ensure the QoS during the delayed time, it is assumed that the packet enters the queue at the beginning of the frame 1 (i.e., the time point $T_1$) and is only transmitted before the frame 14 is over (i.e., at the time point $T_2$), so that the total length of the intervals $S_{i+1}$, $W_{i+1}$, $S_{i+2}$, and $W_{i+2}$ cannot be greater than the maximum grant delay d(A,k). In addition, if only a small quantity of data is accumulated in the intervals $S_{i+1}$ and $W_{i+1}$, the awake interval $W_{i+2}$ is correspondingly shorter so that the sleep interval $S_{i+2}$ can be longer. However, if a large quantity of data is accumulated during the sleep interval $S_{i+2}$ due to the long sleep interval $S_{i+2}$, a long awake interval $W_{i+3}$ is required to transmit the data packet, and which may cause the total length of the intervals $S_{i+2}$, $W_{i+2}$, $S_{i+3}$, and $W_{i+3}$ to be longer than the maximum grant delay d(A,k). As a result, the requirement to the QoS cannot be met. In this case, the sleep interval $S_{i+3}$ can be adjusted (even to 0), and in order to avoid the situation that the QoS cannot be met, the total length of the intervals $S_{i+2}$, $W_{i+2}$, and $W_{i+3}$ has to be less than or equal to the maximum grant delay d(A,k). It should be noted that the sleep interval $S_{i+3}$ is 0 when the total length of the intervals $S_{i+2}$, $W_{i+2}$, and $W_{i+3}$ is equal to the maximum grant delay d(A,k). As described above, the awake interval and the sleep interval can be obtained through following expressions (1) and (2):

$$\begin{cases} S_{i+1} + W_{i+1} + S_{i+2} + W_{i+2} \leq d(A, k) \\ S_{i+2} + W_{i+2} + W_{i+3} \leq d(A, k) \end{cases} \quad (1)$$

$$W_{i+1} = \left\lceil \frac{\sum_j \lambda(A, j)(S_i + W_i)}{\sum_j \mu_{min}(A, j)} \right\rceil \quad (2)$$

$\lambda(A,j)$ in foregoing expression (2) represents the data quantity generated in each frame by the connection j of the MSS A, and $\mu_{min}(A,j)$ represents the minimum data quantity which can be transmitted by the connection j of the MSS A within each frame. When the sleep interval $S_i$ and the awake interval $W_i$ are already obtained, the awake interval $W_{i+1}$ can be obtained through foregoing expression (2), and the sleep interval $S_{i+1}$ can be obtained through foregoing expression (1).

Figure 7:
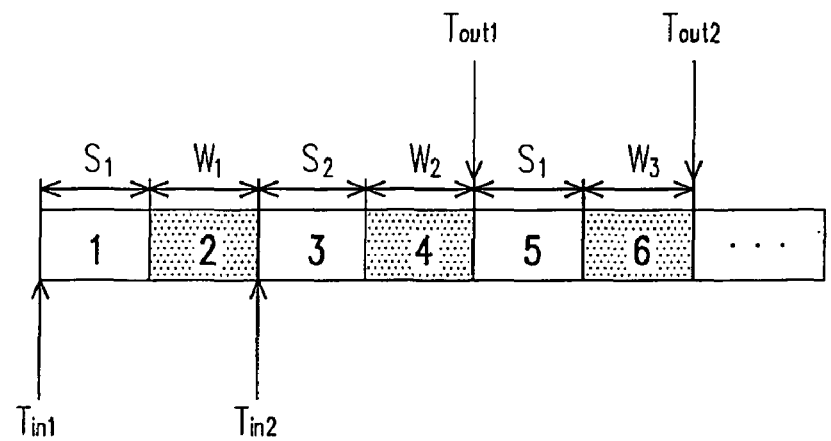
FIG. 7 is another timing diagram of an awake interval and a sleep interval according to the exemplary embodiment consistent of the present invention.

How to determine the lengths of the awake interval and the sleep interval will be described herein with reference to FIG. 7. Here it is assumed that the queue of a MSS is empty when the MSS is about to enter the sleep mode, and the numbers of frames in the first sleep interval $S_1$ and the first awake interval $W_1$ are both 1. Besides, it is assumed that a frame is 1 second, the MSS has six connections, and the data generation rates of the six connections are respectively 256 Kbps, 256 Kbps, 512 Kbps, 512 Kbps, 2 Mbps, and 2 Mbps. If the maximum grant delays d(A,k) of the six connections are respectively 4, 4, 5, 5, 6, and 6 frames, the smallest maximum grant delay d(A,4k) is then 4. Moreover, it is assumed that the link capacity of the MSS is 20 Mbps, namely, the MSS can transmit 20 Mbits data within a frame time. Thus, the data quantity accumulated in the first sleep interval $S_1$ and the first awake interval $W_1$ is (256 Kbits×2+512 Kbits×2+2Mbits ×2)×2=11.072 Mbits data. The second awake interval (i.e. the awake interval $W_2$) needs only one frame to transmit the 11.072 Mbits data. In consideration that the smallest maximum grant delay d(A,k) has to be equal to 4, the second sleep interval $S_2$ can have at most one (i.e., 4−1−1−1) frame. In order to avoid such a situation that too much data is accumulated during the second sleep interval $S_2$ and the second awake interval $W_2$ due to the long second sleep interval $S_2$ and accordingly the data cannot be completely transmitted within the maximum delay time even when the frame number in the sleep interval $S_3$ is 0, whether $S_2+W_2+W_3$ is smaller than or equal to 4 has to be further verified. Since the data accumulated during the interval $S_2$ and the interval $W_2$ are both 11.072 Mbits, the frame number in the third awake interval $W_3$ can be obtained as 1. Accordingly, the total length of the intervals $S_2$, $W_2$, and $W_3$ is equal to 3 (i.e., 1+1+1). Thus, the condition that $(S_2+W_2+W_3)$ has to be smaller than or equal to the smallest maximum grant delay d(A,k) is met. In other words, if the two packets respectively enter the queue at the time points $T_{in1}$ and $T_{in2}$ and are respectively sent out at the time points $T_{out1}$ and $T_{out2}$, the time durations $(T_{out1}-T_{in1})$ and $(T_{out2}-T_{in2})$ are both shorter than or equal to the smallest maximum grant delay d(A,k).

Through the method described above, in the second procedure, the maximum value $S_{max}$ of each sleep interval is obtained without sacrificing the QoS, so that the awake time of the MSS is relatively shortened, and the maximum value $S_{max}$ is defined as the maximum sleep interval $S_{max}$.

In embodiments of the present invention, the step for determining the sleep interval and the awake interval includes obtaining the minimum value of the maximum grant delays of a plurality of non-periodic connections and restricting the lengths of the sleep interval and the awake interval according to the minimum value. The actual sleep interval and the actual awake interval are determined according to the relative position of a last frame in the awake frame candidate set to the sleep interval and the awake interval on the time axis.

Figure 8:
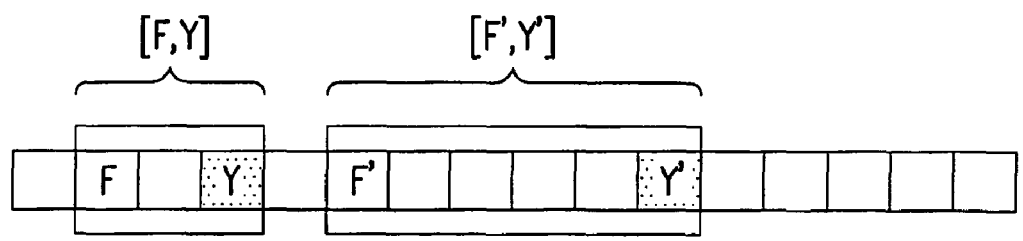
FIG. 8 illustrates a first situation of determining an actual awake interval according to the exemplary embodiment consistent of the present invention.

Third Procedure: The BS Determining the Actual Awake Interval and the Actual Sleep Interval of the MSS According to the Awake Frame Candidate Set, the Awake Interval, and the Sleep Interval In the third procedure, the results obtained in the first procedure and the second procedure are integrated to determine an actual awake interval and an actual sleep interval of a MSS. As described above, in the first procedure, the data of a UGS connection is combined to obtain the awake frame candidate set [F, Y], and in the second procedure, the maximum sleep interval $S_{max}$ and the awake interval W are obtained according to the data of the rtPS connection, the ErtPS connection, or the nrtPS connection. In the third procedure, the results obtained in the first procedure and the second procedure are integrated to obtain the actual awake interval and the actual sleep interval of the MSS. To be specific, the actual sleep interval and the actual awake interval are determined according to the relative position of a last frame Y in the awake frame candidate set [F, Y] to the maximum sleep interval $S_{max}$ and the awake interval W on the time axis. How to determine the actual awake interval and the actual sleep interval of the MSS in the third procedure regarding three different situations will be described below with reference to FIGS. 8~11:

(1) there are only UGS connections: the next frame in which the MSS wakes up is the last frame in the candidate set. As shown in FIG. 8, the MSS wakes up during the $Y^{th}$ frame and the $Y^{th}$ frame.

Figure 9:
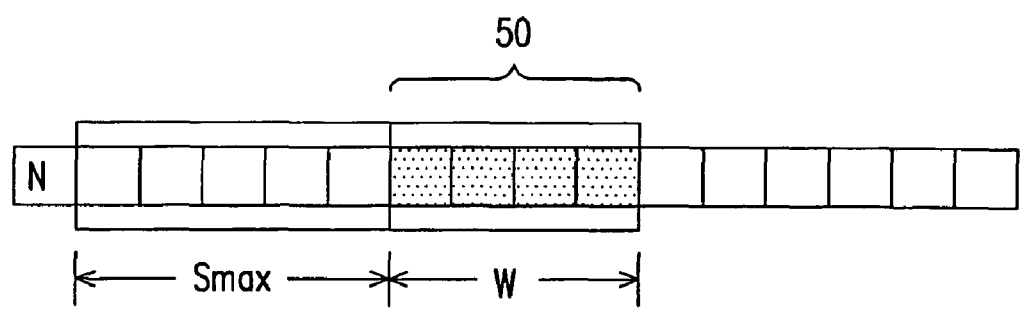
FIG. 9 illustrates a second situation of determining an actual awake interval according to the present invention.

(2) there are only rtPS, ErtPS, or nrtPS connections: assuming the frame before the maximum sleep interval $S_{max}$ is the $N^{th}$ frame, then the next frame in which the MSS wakes up is the frame $[N+S_{max}+1 \sim N+S_{max}+W]$. As shown in FIG. 9, the actual awake interval is the interval 50.

Figure 10:
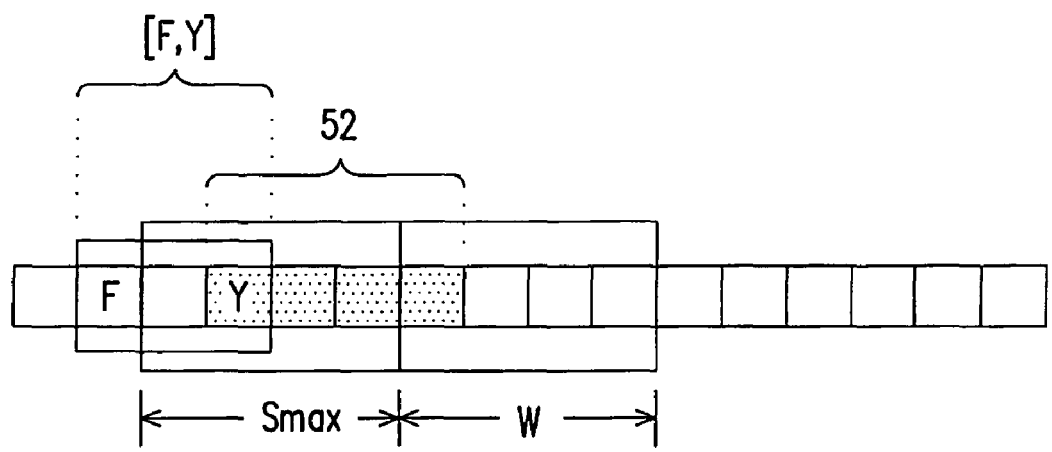
FIG. 10 illustrates a third situation of determining an actual awake interval according to the exemplary embodiment consistent of the present invention.
Figure 11:
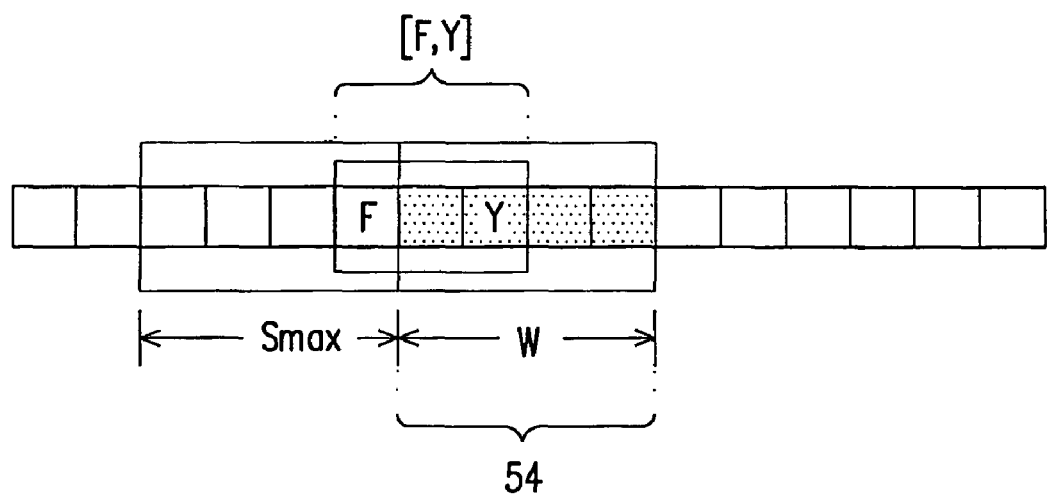
FIG. 11 illustrates a fourth situation of determining an actual awake interval according to the exemplary embodiment consistent of the present invention.

(3) there is at least one of the rtPS, ErtPS, and nrtPS connections and there are UGS connections: the present embodiment focuses on the combination result of UGS data, if there is an awake frame candidate set of the UGS connection in the interval $S_{max}$, the MSS sleeps until the $(Y-1)^{th}$ frame, and the awake interval W is brought forward to start from the $Y^{th}$ frame. Thus, the actual awake interval is the frame [Y~Y+W−1]. As shown in FIG. 10, the actual awake interval is the interval 52, and the first awake frame is the $Y^{th}$ frame. However, if the awake frame candidate set [F,Y] of the UGS connection overlaps the awake interval W, the awake interval is the frame $[S_{max}+1 \sim S_{max}+W]$, namely, the actual awake interval is the frame of the awake interval W. As shown in FIG. 11, the actual awake interval is the interval 54.

The algorithm in the third procedure can be expressed with following pseudo codes:

step 1: Let X be the set of all awake-frame candidate sets.
step 2: Find the candidate set with the smallest F value from X, and denoted as $[F_1, Y_1]$. step 3: For $[F_1, Y_1]$, finding the closest sleep and awake intervals and denoting them as [S, W]. The first frame in S is represented as $s_1$. The number of frames in W is represented as $Num_w$.
step 4: If $Y_1 < s_1$, adding a new awake frame that is equal to $Y_1$ then go to step 7; else go to step 5. step 5: If $Y_1 \cap S \neq 0$, adjusting awake interval W to be $[Y_1, Y_1+Num_w-1]$ then go to step 7; else go to step 6; step 6: If $Y_1 \cap W \neq 0$, awake interval W remains intact. Go to step 7.
step 7: X=X−[F, Y], and go to step 2.

In short, the awake interval and sleep interval [S, W] of a rtPS, an ErtPS, or an nrtPS connection closest to the awake frame candidate set [F, Y] of each UGS connection are first obtained, and then whether the awake frame candidate set [F, Y] intersects the [S, W] is determined to combine the data. In step 4, whether the awake frame candidate set [F,Y] intersects the [S, W] is first determined. If there is no intersection between the two, an awake interval (i.e., the interval Y) is added to the awake frame candidate set [F, Y]. In step 5, whether the awake frame candidate set [F, Y] intersects the union set S is further determined. If there is intersection between the two, the entire awake interval W is brought forward. In step 6, whether the awake frame candidate set [F, Y] intersects the awake interval W is further determined. If there is intersection between the two, the entire awake interval W is unchanged. Finally, the currently determined awake frame candidate set [F, Y] is removed from all the awake frame candidate sets. and then the procedure returns to step 2 to determine the next awake frame candidate set.

Because the power consumed by the wireless network device during the actual sleep interval is lower than the power consumed by the same during the actual awake interval, the actual awake interval of the wireless network device can be greatly shortened through the method described above and accordingly the power consumption thereof can be considerably reduced.

Figure 12:
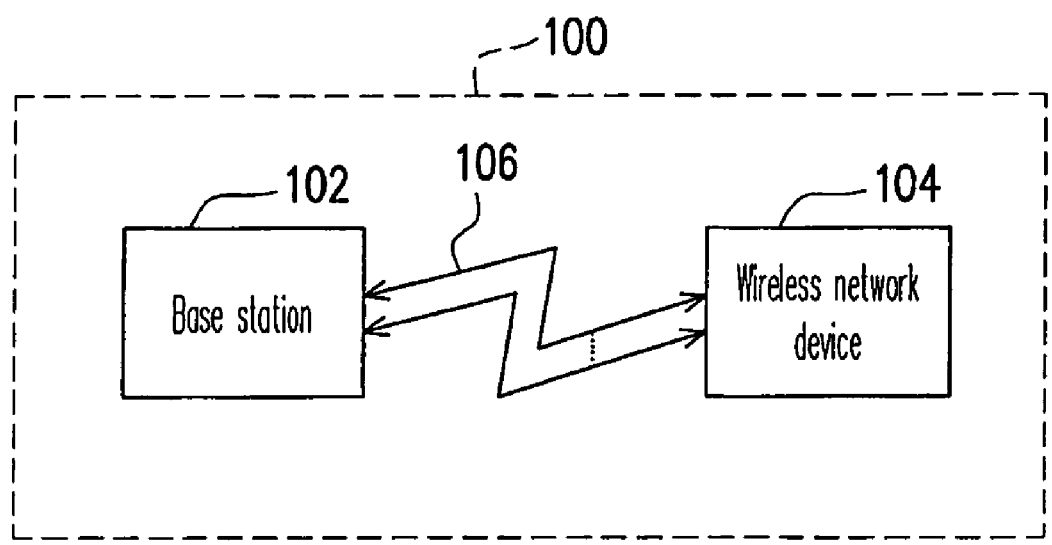
FIG. 12 is a functional block diagram of a system for dynamically adjusting the sleep/awake intervals of a wireless network device according to the exemplary embodiment consistent of the present invention.

FIG. 12 is a functional block diagram of a system 100 for dynamically adjusting the sleep/awake intervals of a wireless network device. Referring to FIG. 12, the system 100 includes at least one BS 102 and a wireless network device 104. In the IEEE 802.16e standard, the wireless network device 104 is a MSS. A plurality of connections 106 is established between the BS 102 and the MSS 104 for transmitting/receiving frames, wherein each of the connections 106 may be a UGS, an rtPS, an ErtPS, an nrtPS, or a BE connection. The BS 102 dynamically adjusts the sleep/awake intervals of the MSS 104 through the three procedures described above so as to reduce the power consumption of the MSS 104.

The method for dynamically adjusting the sleep/awake intervals of the wireless network device will be discussed respectively from the MSS end and the BS end:

(1) The MSS end: the MSS 104 needs only send a message to the BS 102 through piggyback before the current awake interval thereof is over to notify the BS 102 that it is going to enter a sleep interval and what its current queue size is. The major advantage of this mechanism is that no additional hardware is to be added to the existing MSS 104 and no new frame format is to be defined.

(2) The BS end: after receiving the queue size from the MSS 104, the BS 102 calculates the sleep time of the MSS 104 and the resources (i.e., the number of frames) to be assigned to the MSS 104 when next time it wakes up according to the QoS parameters of each connection 106 of the MSS 104, so as to determine the actual sleep interval and the actual awake interval of the MSS 104. Because the actual sleep interval and the actual awake interval can be notified to the MSS 104 through downlink-MAP (DL-MAP) and uplink-MAP (UL-MAP), the BS 102 does not need not to define a new frame format. The MSS 104 can switch between the sleep mode and the awake mode according to the actual sleep interval and the actual awake interval defined by the BS 102.

Figure 13:
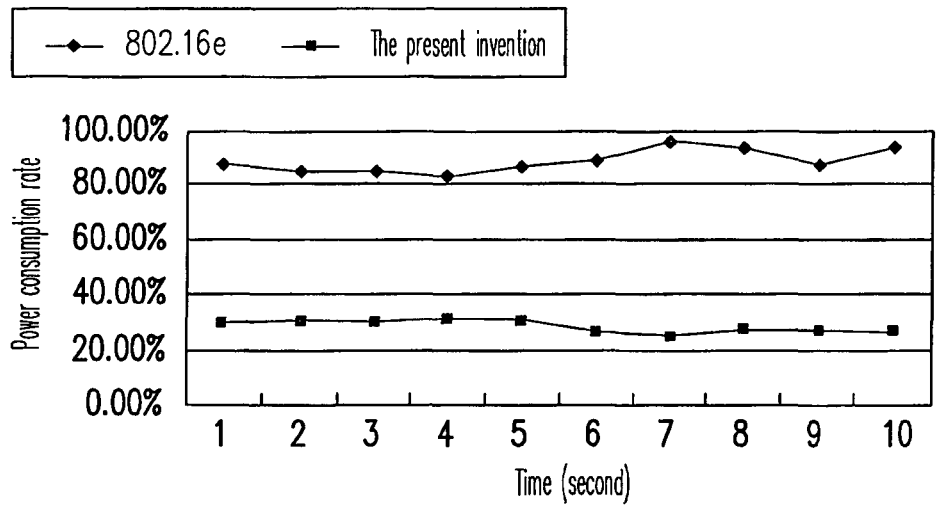
FIG. 13 shows the comparison between the power consumption in the conventional technique and the power consumption according to the exemplary embodiment consistent of the present invention.
Figure 14:
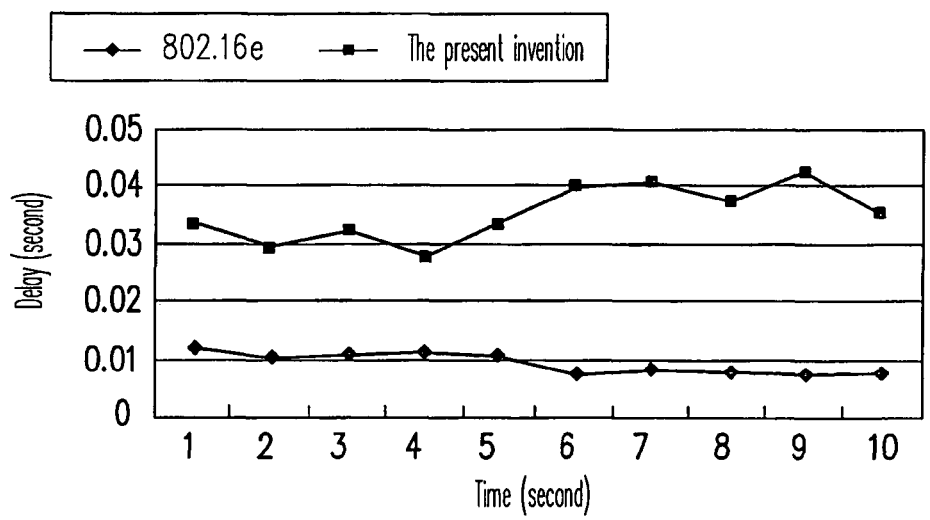
FIG. 14 shows the comparison between the downlink delay in the conventional technique and the downlink delay according to the exemplary embodiment consistent of the present invention.
Figure 15:
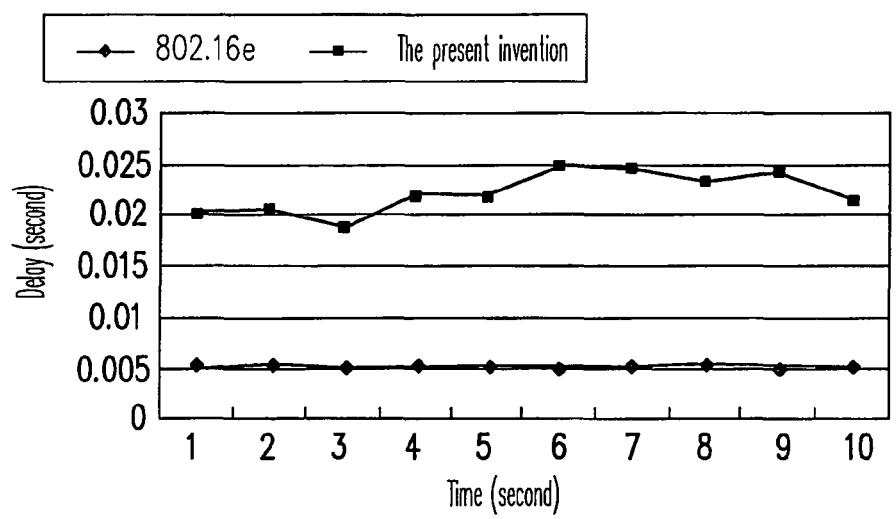
FIG. 15 shows the comparison between the uplink delay in the conventional technique and the uplink delay according to the exemplary embodiment consistent of the present invention.

FIGS. 13~15 are diagrams illustrating the performance estimation of the method for dynamically adjusting the sleep/awake intervals of a wireless network device through program simulations. First, the power consumption rate is defined as the quotient obtained by dividing the number of awake frames by the number of all the frames. As shown in FIG. 13, compared to the power-saving mechanism defined in the IEEE 802.16e standard, the method in the present invention greatly reduces the number of awake frames at a node. In addition, FIGS. 14 and 15 respectively show the comparison result of the delay time performance regarding a downlink connection and an uplink connection between the present invention and the conventional art. Because the method in the present invention reduces the power consumption by delaying data transmission, the average delay time is longer than that in the IEEE 802.16e standard; however, the method in the present invention still meets the requirement of a connection to the maximum delay time.

It should be noted that even though foregoing embodiments are described based on the IEEE 802.16e network structure, the present invention is not limited thereto. Any technique which conforms to the concept of "respectively calculating the awake frame candidate set and the maximum sleep interval according to real-time and non-real-time data types and then dynamically adjusting the sleep/awake intervals according to the awake frame candidate set and the maximum sleep interval" is within the scope of the present invention.

In overview, the exemplary embodiment consistent of the present invention provides a power-saving mechanism for dynamically adjusting the sleep/awake intervals of a wireless network, especially of an IEEE 802.16e Mobile WiMAX network, wherein a MSS is allowed to enter a sleep mode after transmitting data within an interval by appropriately delaying and combining the data to be transmitted. In the present invention, the number of awake frames is greatly reduced at the MSS end, but user's requirements to the QoS (including the operation bandwidth and the average delay time etc) is still met.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically adjusting sleep/awake intervals of a wireless network device, the method comprising:

determining at least one awake frame candidate set of the wireless network device according to a transmission cycle and a maximum grant delay of at least one periodic connection of the wireless network device;

determining at least one sleep interval and at least one awake interval of the wireless network device according to a data generation rate and a maximum grant delay of at least one non-periodic connection of the wireless network device;

determining an actual sleep interval and an actual awake interval of the wireless network device according to the awake frame candidate set, the sleep interval, and the awake interval; and controlling the wireless network device to sleep during the actual sleep interval and to wake up during the actual awake interval.

2. The method as claimed in claim 1, wherein the periodic connection is an Unsolicited Grant Service (UGS) connection.

3. The method as claimed in claim 1, wherein the non-periodic connection is selected from a group consisted of a real-time Polling Service (rtPS) connection, an Extended rtPS (ErtPS) connection, and a non-real-time Polling Service (nrtPS) connection.

4. The method as claimed in claim 1, wherein the awake frame candidate set is determined according to transmission cycles and maximum grant delays of a plurality of periodic connections of the wireless network device.

5. The method as claimed in claim 4, wherein the step for determining the awake frame candidate set comprises:

delaying data transmission of each of the connections according to the maximum grant delay of the connection, and restricting the delayed time of the data transmission to be less than or equal to the maximum grant delay of the connection.

6. The method as claimed in claim 4, wherein the step for determining the awake frame candidate set comprises:

determining a grant delay range of a relaying frame according to the maximum grant delay of each of the connections; and determining the awake frame candidate set according to overlapping of the grant delay range of each of the relaying frames.

7. The method as claimed in claim 1, wherein the sleep interval and the awake interval are determined according to data generation rates and maximum grant delays of a plurality of non-periodic connections of the wireless network device.

8. The method as claimed in claim 7, wherein the step for determining the sleep interval and the awake interval comprises:
obtaining a minimum value of the maximum grant delays of the non-periodic connections; and
restricting a length of the sleep interval and a length of the awake interval according to the minimum value.

9. The method as claimed in claim 7, wherein the step for determining the sleep interval and the awake interval comprises:
calculating a relayed data quantity according to the data generation rates of the non-periodic connections and the lengths of a previous sleep interval, a previous awake interval, and the sleep interval; and
calculating the length of the awake interval according to the relayed data quantity and a link capacity of the wireless network device.

10. The method as claimed in claim 9, wherein the step for determining the sleep interval and the awake interval comprises:
adjusting the length of the sleep interval according to the relayed data quantity.

11. The method as claimed in claim 1, wherein the actual sleep interval and the actual awake interval are determined according to a relative position of a last frame in the awake frame candidate set to the sleep interval and the awake interval on a time axis.

12. The method as claimed in claim 11, wherein the step for determining the actual sleep interval and the actual awake interval comprises:
setting the last frame in the awake frame candidate set as a part of the actual awake interval when the last frame in the awake frame candidate set overlaps neither the sleep interval nor the awake interval.

13. The method as claimed in claim 11, wherein the step for determining the actual sleep interval and the actual awake interval comprises:
bringing the awake interval forward when the last frame in the awake frame candidate set overlaps the sleep interval.

14. The method as claimed in claim 11, wherein the step for determining the actual sleep interval and the actual awake interval comprises:
setting the actual awake interval as the awake interval when the last frame in the awake frame candidate set overlaps the awake interval.

15. The method as claimed in claim 1, wherein the wireless network device establishes connections and relays data according to IEEE 802.16e standard.

16. A system for dynamically adjusting sleep/awake intervals of a wireless network device, comprising:
at least one wireless network device; and
at least one base station (BS), wherein a plurality of connections is established between the BS and the wireless network device, the BS determines an awake frame candidate set of the wireless network device according to a transmission cycle and a maximum grant delay of a periodic connection among the connections, the BS also determines a sleep interval and an awake interval of the wireless network device according to a data generation rate and a maximum grant delay of a non-periodic connection among the connections, and the BS further determines an actual sleep interval and an actual awake interval of the wireless network device according to the awake frame candidate set, the sleep interval, and the awake interval.

17. The system as claimed in claim 16, wherein the periodic connection is an Unsolicited Grant Service (UGS) connection.

18. The system as claimed in 16, wherein the non-periodic connection is selected from a group consisted of an rtPS connection, an ErtPS connection, and an nrtPS connection.

19. The system as claimed in claim 16, wherein the connections are established according to IEEE 802.16e standard.

20. A method for dynamically adjusting the sleep/awake intervals of a wireless network device, comprising:
determining a grant delay range of each relaying frame of a plurality of periodic connections of the wireless network device according to transmission cycles and maximum grant delays of the periodic connections; and
determining an awake frame candidate set of the wireless network device according to overlapping of the grant delay range of each of the relaying frames, and allowing the wireless network device to transmit data within the relaying frames in the awake frame candidate set.

21. The method as claimed in claim 20 further comprising:
delaying data transmission of each of the connections according to the maximum grant delay of the connection, and restricting the delayed time of the data transmission to be less than or equal to the maximum grant delay of the connection.

22. A method for dynamically adjusting the sleep/awake intervals of a wireless network device, comprising:
obtaining a minimum value of maximum grant delays of a plurality of non-periodic connections of the wireless network device according to information of the maximum grant delays of the non-periodic connections;
obtaining a queue size according to a length of an $i^{th}$ sleep interval, a length of an $i^{th}$ awake interval, and data generation rates of the non-periodic connections of the wireless network device, wherein i is a positive integer;
obtaining a length of an $(i+1)^{th}$ awake interval of the wireless network device according to the queue size and a link capacity of the wireless network device;
obtaining a length of an $(i+1)^{th}$ sleep interval of the wireless network device according to the minimum value, the length of the $i^{th}$ sleep interval, the length of the $i^{th}$ awake interval, and the length of the $(i+1)^{th}$ awake interval, and restricting a total length of the $i^{th}$ sleep interval, the $i^{th}$ awake interval, the $(i+1)^{th}$ sleep interval, and the $(i+1)$th awake interval to be less than or equal to the minimum value; and
controlling the wireless network device to be in a sleep mode during the $i^{th}$ sleep interval and the $(i+1)^{th}$ sleep interval and transmit data during the $i^{th}$ awake interval and the $(i+1)^{th}$ awake interval.

23. The method as claimed in claim 22 further comprising:
obtaining a second queue size according to the length of the $(i+1)^{th}$ sleep interval, the length of the $(i+1)^{th}$ awake interval, and the data generation rates of the non-periodic connections; and
obtaining a length of an $(i+2)^{th}$ awake interval of the wireless network device according to the second queue size and the link capacity, and restricting a total length of the $(i+1)^{th}$ sleep interval, the $(i+1)^{th}$ awake interval, and the $(i+2)^{th}$ awake interval to be less than or equal to the minimum value.

* * * * *